Figure 1:
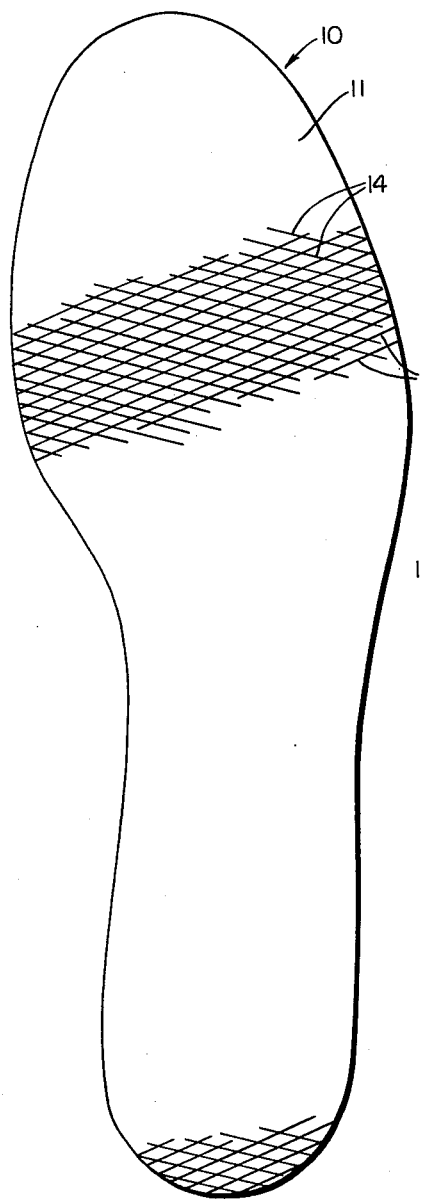

May 14, 1963  F. C. MESERVE  3,089,164
SOLE SLITTING MACHINE
Filed Aug. 4, 1961  2 Sheets-Sheet 1

INVENTOR.
F. Clayton Meserve
BY

May 14, 1963  F. C. MESERVE  3,089,164
SOLE SLITTING MACHINE
Filed Aug. 4, 1961  2 Sheets-Sheet 2

INVENTOR.
F. Clayton Meserve
BY

Att'ys.

3,089,164
Patented May 14, 1963

1

3,089,164
SOLE SLITTING MACHINE
Forrest Clayton Meserve, North Andover, Mass., assignor to Micro Machinery Products, Inc., Winchester, Mass., a corporation of Massachusetts
Filed Aug. 4, 1961, Ser. No. 129,326
11 Claims. (Cl. 12—40)

This invention comprises a new and improved machine for imparting a high-traction tread surface to elastomeric soles or sole blanks by forming in them a pattern of transverse, normally closed slits. The machine is constructed and arranged to carry out the novel process of slitting such soles as herein disclosed.

It has been found that an unexpectedly efficient high-traction, non-slipping tread surface may be imparted to a flexible elastomeric sole by forming therein a pattern of normally closed transverse slits, uniformly spaced and inclined with respect to the longitudinal axis of the sole. The slits are preferably parallel and of a depth approximately equal to their spacing, for example, two or three sixteenths of an inch. Also preferably they are arranged in two series that intersect in herringbone or diamond formation. The present invention has solved the problem of producing such soles commercially at high speed and at a cost acceptable to the shoemaking industry.

The machine of my invention comprises a drum having a pronounced helical thread together with a cooperating flexible work feeding member, such as a tire, movable about a fixed axis in such relation with the drum that an interposed sole blank is indented and advanced bodily with the tire by the threads of the drum. The machine also includes a conveyor for presenting sole blanks one by one to the bite of the drum and tire. The drum is equipped with a helical knife blade of the same pitch as its threads and this blade passes through the tread face of the soles and thus forms the desired slits therein. Provision is made for relative angular adjustment of the drum and tire so that the slits may be formed with any desired degree of inclination to the longitudinal axis of the soles presented to the drum.

The machine of my invention is further characterized by the provision of a frame located above the drum and having provision for angular horizontal adjustment. The frame carries a conveyor and also a pair of arms that are independently adjustable in a vertical direction and carry between them the transverse shaft for the tire. This construction affords convenient provision for not only adjusting the inclination of the slits formed by the helical knife of the drum, but also adjusting the rotary path of the tire with respect to the conveyor and also with respect to the drum. Accurate delivery of the succesive soles to the operating position of the knife is thus insured and soles of different thickness may be readily accommodated.

Figure 2:
Figure 3:
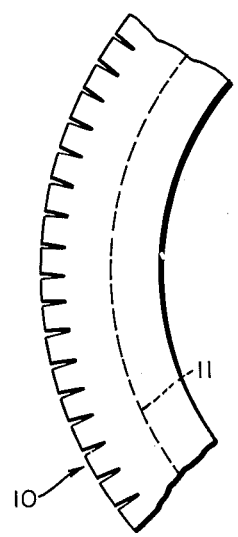
Figure 4:
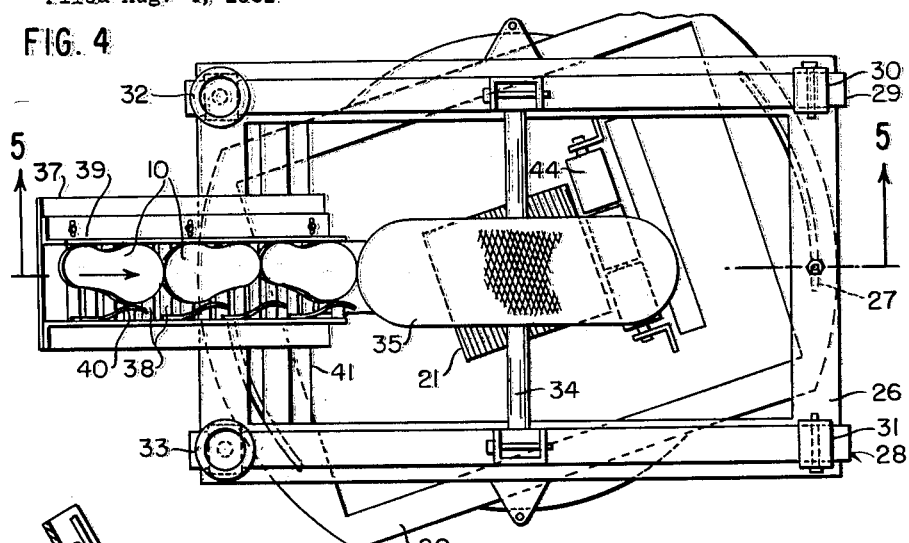
Figure 5:
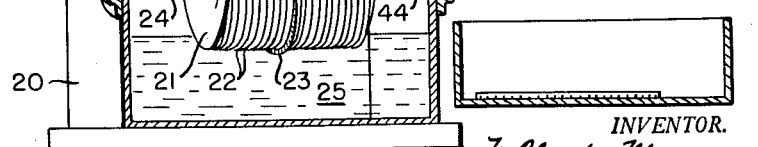

These and other features of the invention will be best understood and appreciated from the following description of a preferred embodiment of the machine selected for purposes of illustration and shown in the accompanying drawings, in which:

FIG. 1 is a plan view showing the tread face of the sole as treated in accordance with the present invention,
FIG. 2 is a view in side elevation,
FIG. 3 is a fragmentary view on an enlarged scale showing a portion of the sole flexed to open the slits therein,
FIG. 4 is a plan view of the machine, and
FIG. 5 is a corresponding view in side elevation.

The complete sole or sole blank 10 as shown in FIGS. 1, 2 and 3 comprises an elastomeric body of a rubber compound, resilient synthetic resin or similar compounds which are highly flexible and elastic in their nature. The treated face of the sole is flat while its inner or attaching face is concave to fit the bottom of the lasted upper. The entire tread face of the sole is provided with a series of normally closed equally spaced slits 13. These slits are parallel and disposed at an angle of approximately 80° to the longitudinal axis of the sole and in depth they are approximately equal to the spacing of the slits. Preferably and as herein shown the series of slits 13 is criss-crossed by a second series of slits 14 disposed at approximately the same but opposite inclination to the axis of the sole so that together they form a herringbone or diamond pattern. As above stated these slits are normally closed but tend to open when the sole is flexed as suggested in FIG. 3. The infinite number of edges or angles presented by these slits when the sole is subjected to pressure and flexing by the wearer impart to it a high traction characteristic which is greatly appreciated by yachtsmen and other wearers who desire particularly secure footing.

As herein shown the sole of FIGS. 1-3 may be advantageously produced by the machine shown in FIGS. 4 and 5 which will now be described. This machine comprises a stationary base 20 in which is mounted a drum 21 having a pronounced helical thread formed in its cylindrical surface from which also projects a helical knife blade 23 having the same pitch as the threads of the drum. The function of the threads 22 is to indent and feed the sole blanks one after another while the blade 23 passes through their tread surface and forms the slits 13 or 14 above described. The drum 21 is mounted upon the shaft 24 journaled in the base 20 and driven from any convenient source of power. The drum or at least the helical blade 23 dips in a reservoir containing a liquid lubricant 25.

Secured to the upper portion of the base is a frame 26 and from the right hand end of this frame as shown in FIGS. 4 and 5 project upright posts 30 and 31. To the post 30 is pivotally connected an arm 29 and to the post 31 a corresponding arm 28. The posts are provided with a series of pivot holes so that the arms 28 and 29 may be vertically adjusted at this end of the frame. The frame carries at each corner of its other end upright screws 32 and 33 having a threaded and swivel connection with the free end of the respective arms and by this means each arm may be independently raised or lowered for the purpose of bodily lifting or canting a transverse shaft 34 journaled at its ends in self-aligning bearings in the arms. Upon the shaft 34 is mounted a hub and sole feeding member in the shape of a tire 35, the latter being arranged to present a sole in biting relation with the threads of the drum 21. That is to say, that when no work is passing through the machine the tire will clear the surface of the drum but when a sole is interposed the thread of the drum will indent and rotate the sole with the tire without cutting the tire.

The frame 26 is mounted upon the base 20 for angular adjustment in the horizontal plane about a vertical axis passing through the vertical axes of the drum 21 and the tire 35. For this adjustment circular slots 27 are provided for a clamping bolt for the frame. It is by this horizontal adjustment of the frame that the angle of the slits 13 or 14 in the sole blank is determined.

At the left hand end of the frame is provided an upright bracket 36 to the upper end of which is secured an inclined conveyor 37 provided with rolls 38 and leading to the bite of the drum 21 and the tire 35. The conveyor 37 is provided at one side with an adjustable gauge 39 of angular cross-section and at the other side with a series of spring fingers 40 which are designed to hold the sole blanks 10 in procession against the gauge strip 39. In practice the operator will keep this conveyor full by placing the sole blanks against the gauge 39, toe to heel, with the inside shank edge of the sole against the gauge.

The frame 26 carries a transverse angle strut 41 which passes beneath the delivery end of the conveyor and supports a tension spring 42 which constantly urges the lower end of the conveyor toward the tire 35, some lost motion being permitted at this point by the spring of the bracket 36. The conveyor is provided with an extension 43 in the shape of a curved spring plate which extends concentrically with the tire 35 and is effective to lead successive sole blanks up to the bite of the drum where the sole blank will be indented and advanced by the helical threads 22 of the drum. In passing the blade 23 the successive slits are formed at a spacing corresponding to the pitch of the blade. As the slitted sole passes from feeding contact of the drum 21 it contacts a delivery roll 44 located at the delivery end of the drum and emerges from the machine.

It will be understood that with one setting of the frame 26 the series of slits 13 may be formed and this may be all that is required of the product. However, it has been found desirable to impart a herringbone or diamond pattern to the slits and this is effected by reversing the angular position of the frame 26 and passing the soles through the machine for a second time. It has been found advantageous to provide the surface of the tire 35 with intersecting transverse slits of substantially the same pitch as those formed in the sole blank as this increases the traction of the tire upon the sole blanks and insures the advance of each sole blank from the inclined conveyor to a point where the sole comes into the control of the drum 21.

It will be understood that the vertical position of the tire 35 with respect to the drum 21 may be adjusted and the pressure of engagement on the interposed sole governed by changing the pivot points at the right hand end of the frame 26 or by manipulation of the screws 32 and 33. In practice the tire should wrap the sole about the convex threaded surface of the drum in order to make the slits uniform in depth from edge to edge.

The angular adjustment of the frame 26 about its vertical axis governs the angle of the slits 13 and 14 as already explained and in practice an angle of 70° to 80° has been found entirely satisfactory.

The axis of the tire 35 may also be slightly tipped or canted in one direction or the other in order to cause the sole blanks 10 to track accurately to and through the working position of the helical knife blade 23.

Having thus disclosed my invention and described in detail a typical machine, I claim and desire to secure by Letters Patent:

1. A machine for making elastomeric soles of high traction tread, comprising a threaded drum rotatable about a fixed axis and carrying a projecting helical blade, flexible sole feeding means for pressing a sole blank into transverse curvature against said drum whereby, in the rotation of the drum, the helical blade is caused to pass transversely through the sole to form a pattern of normally closed slits in the tread face thereof.

2. A machine for slitting the tread of elastomeric soles, comprising a rotary drum having a helical blade projecting above its cylindrical surface, a tire mounted to rotate about an axis disposed at an angle to that of the drum and in close proximity to the drum, and means for advancing one sole blank after another to the bite of the tire and drum within the path of said helical blade.

3. A machine for slitting elastomeric soles as described in claim 2, further characterized in that the tire is mounted with said sole advancing means in a frame angularly adjustable with respect to the axis of the drum, whereby the angle of slit may be varied in the soles as presented to the drum.

4. A slitting machine of the class described comprising a threaded rotary drum having a projecting helical knife blade, pivoted arms mounted adjacent to the drum, a transverse tire-supporting shaft carried by said arms, and means for adjusting the arms independently to determine the angle of contact between the drum and a tire on said shaft.

5. A slitting machine of the class described comprising a threaded rotary drum having an outwardly projecting helical knife blade, a frame mounted for horizontal angular adjustment above the drum, an arm mounted for vertical adjustment at each side of the frame, a transverse tire-supporting shaft carried between said arms, and means for securing each arm independently in different positions of vertical adjustment.

6. A slitting machine as described in claim 5 further characterized in that the said horizontally adjustable frame carries a conveyor for directing one sole after another to the bite of the drum and tire.

7. A machine for slitting elastomeric soles, comprising a threaded rotary drum having a helical knife blade, a tire mounted to rotate with a sole in biting relation to the drum, and an inclined conveyor having a spring extension leading to the bite of the drum and tire.

8. A machine for slitting elastomeric soles, comprising a threaded rotary drum carrying a helical knife blade, a tire mounted to rotate with a sole in biting relation to the drum, and a conveyor leading toward the bite of the drum and tire, and spring means pressing the lower end of the conveyor toward the tire.

9. A machine for slitting elastomeric soles, comprising a base containing a threaded drum carrying a helical knife blade and arranged to be driven about a fixed axis, an overhead frame mounted for horizontal angular adjustment above the drum, a pair of arms pivotally mounted on said frame for independent vertical adjustment, a transverse shaft journalled in said arms and carrying a tire arranged to rotate carrying a sole in biting relation to said drum, and an inclined conveyor leading to the bite of the drum and tire and being movable together with said overhead frame in the angular adjustment thereof.

10. A machine for slitting elastomeric soles, comprising a driven roll having a pronounced helical thread and a helical knife blade projecting radially beyond the thread, a flexible tire mounted to rotate above and to carry a sole in biting relation with the drum, means for interposing sole blanks one after another between the tire and the drum, thereby causing the tire to wrap each sole partially about the threaded cylindrical surface of the drum while the blade passes through the contiguous surface of the sole.

11. A machine for transversely slitting the flat tread face of an elastomeric sole having a concave inner face, comprising a driven drum having helical threads and a helical blade, a flexible work feeding member arranged to carry a sole into engagement with the threads of the drum and to be advanced thereby, and means to feed successive soles to the bite of the drum and feeding member whereby the feeding member engages the concave face of the soles and the flat tread face of each sole is wrapped about the cylindrical surface of the threaded drum and slit to uniform depth from edge to edge.

References Cited in the file of this patent

UNITED STATES PATENTS

| | | |
|---|---|---|
| 2,124,986 | Pipes | July 26, 1938 |
| 2,139,765 | Merritt | Dec. 13, 1938 |
| 2,162,912 | Craver | June 20, 1939 |
| 2,380,227 | Freeman | July 10, 1945 |

FOREIGN PATENTS

| | | |
|---|---|---|
| 126,811 | Switzerland | July 2, 1928 |